United States Patent [19]

Kaspar et al.

[11] 4,284,400
[45] Aug. 18, 1981

[54] POSITIVE EXTRACTOR FOR CUP MOLDING MACHINE

[75] Inventors: Peter D. Kaspar; Carroll D. Satterfield, both of Dover, Del.

[73] Assignee: International Playtex, Inc., Stamford, Conn.

[21] Appl. No.: 170,274

[22] Filed: Jul. 18, 1980

[51] Int. Cl.³ .......................... B29C 17/00; B29C 7/00
[52] U.S. Cl. ..................................... 425/444; 249/68; 425/398; 425/403.1
[58] Field of Search ............ 425/444, 394, 398, 403.1; 249/67, 68

[56] References Cited

U.S. PATENT DOCUMENTS 3,811,811  5/1974  Horl .............................. 425/444 X Primary Examiner—Howard J. Flint, Jr.
Attorney, Agent, or Firm—Stewart J. Fried; Michael J. Kelly

[57] ABSTRACT

There is disclosed a positive extraction mechanism for use in a textile molding apparatus preferably of the type having a female mold member and a male mold member. The mold members move into molding relationship with a fabric therebetween to form a cup-like article which is retained by one of the members. The positive extraction mechanism moves into intimate contact with the retaining mold member after the other mold member has been retracted. The extraction mechanism includes a plurality of pins which may be actuated by power means into engagement with the molded cup-like article. Each pin is spring biased away from the molded article so that the spring will retract its associated pin within the extraction mechanism upon removal of the power means. Upon retraction the molded article will leave the positive extraction mechanism. This occurs after the molded article has been carried away from the mold member.

16 Claims, 9 Drawing Figures

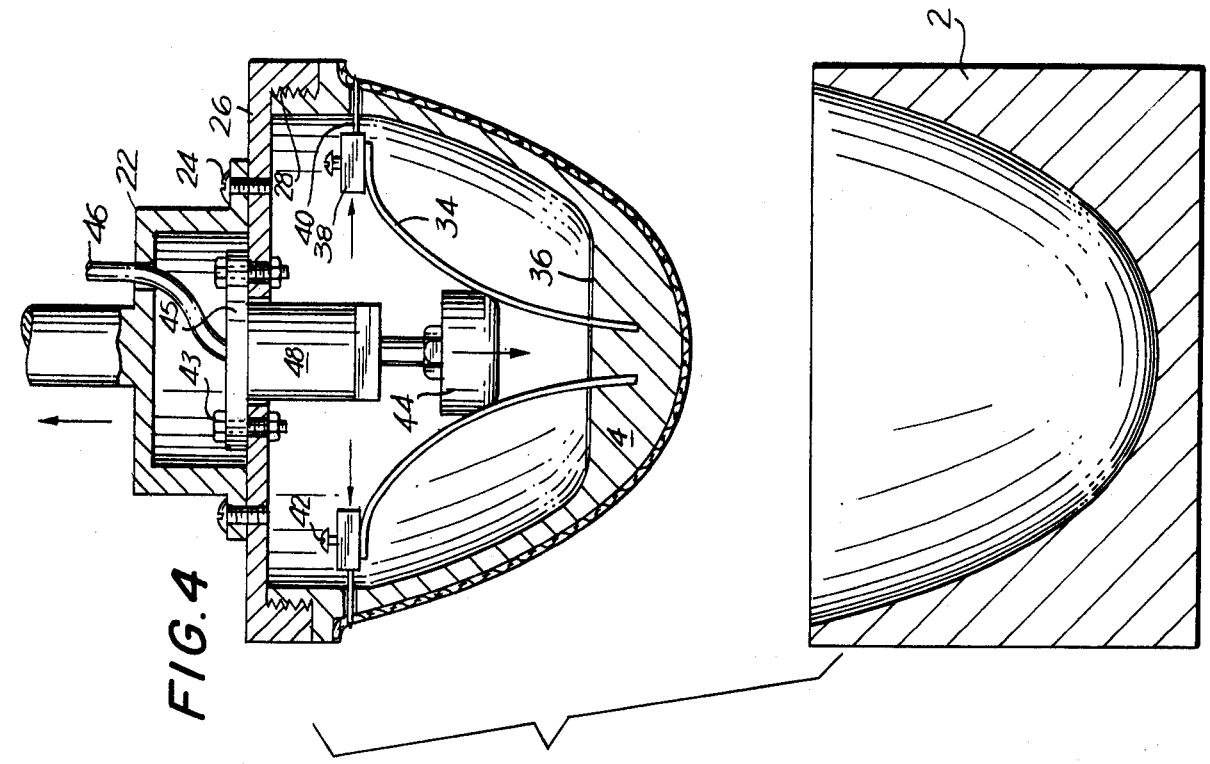
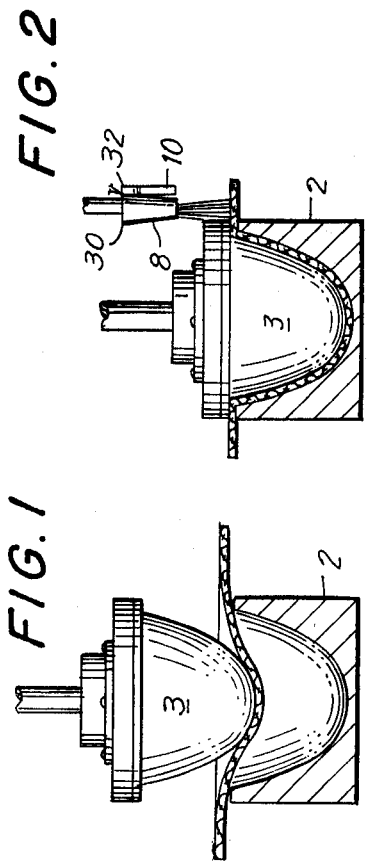
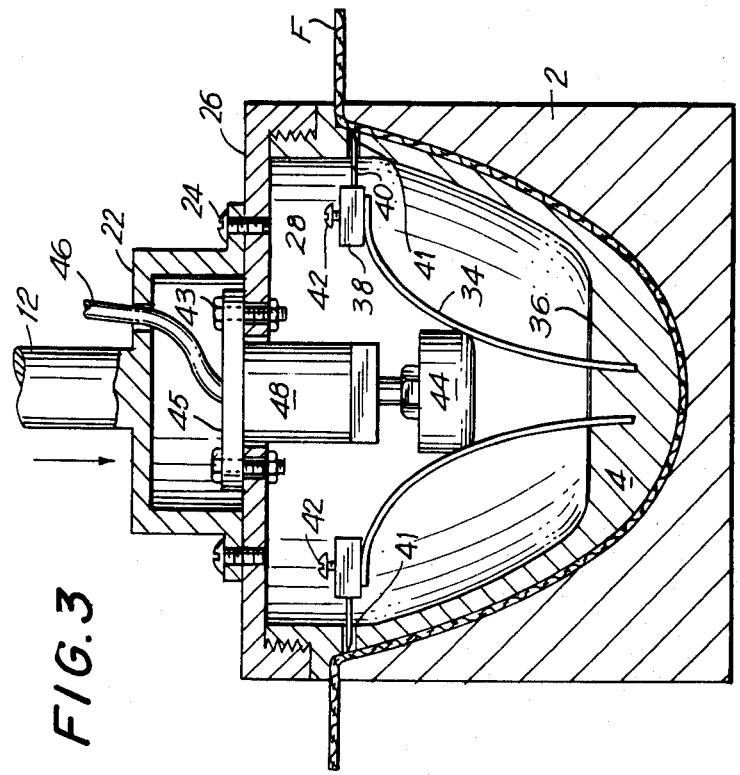

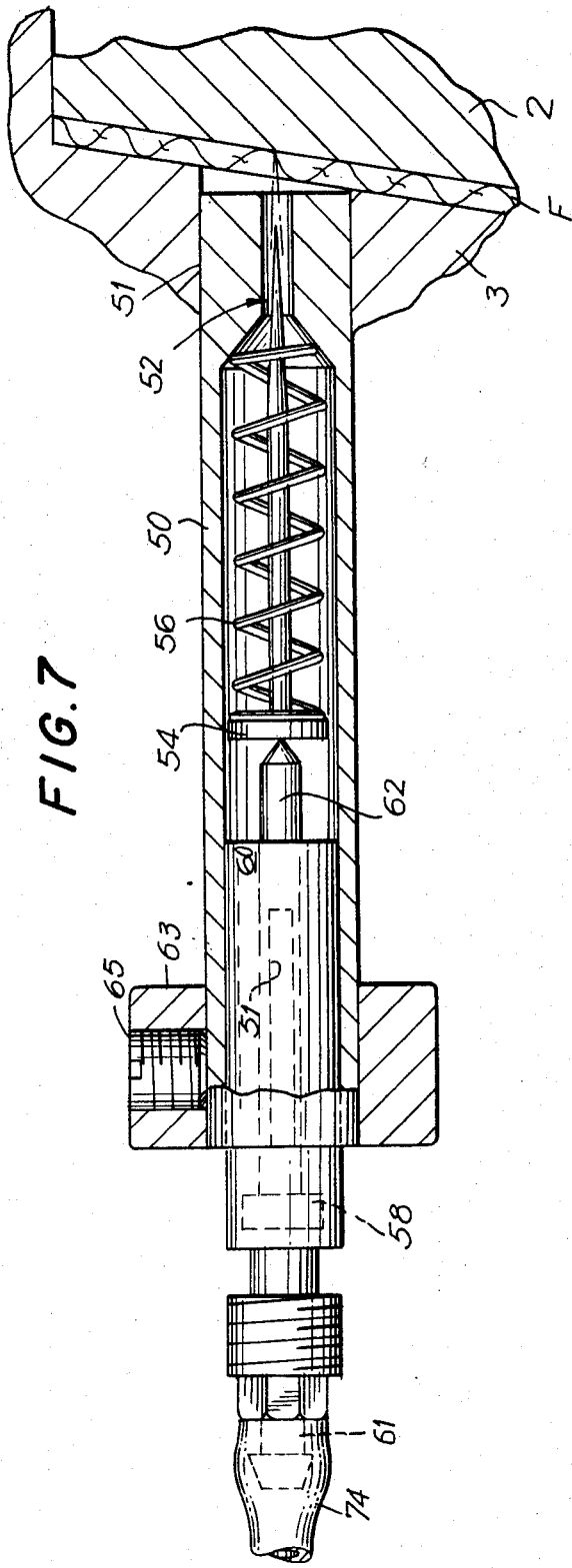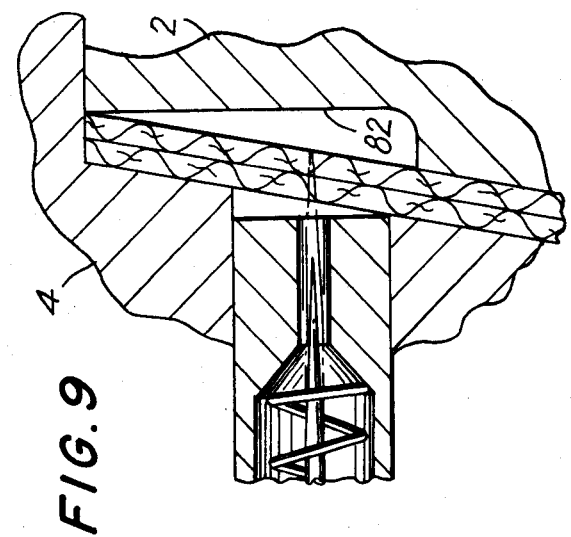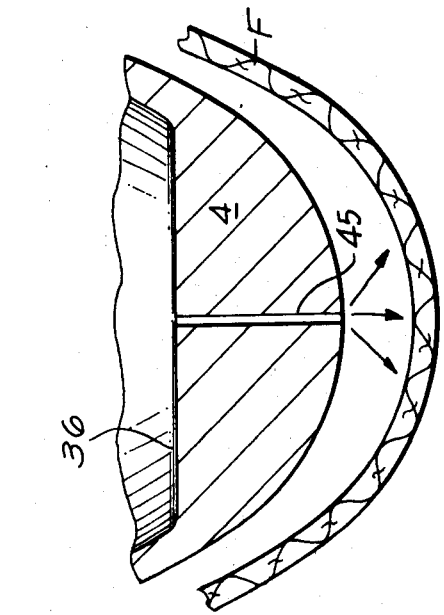

POSITIVE EXTRACTOR FOR CUP MOLDING MACHINE

BACKGROUND OF THE INVENTION

This invention relates to a fabric molding apparatus for molding cup-like articles such as brassiere cup components. More particularly the invention relates to a positive extraction mechanism which can be moved into mating relationship with a mold member with the extractor mechanism having means for engaging the molded article and carrying it away from the mold.

Typically, brassieres are constructed of a number of elements, including two breast receiving units generally referred to as cups or cup members.

In more recent years many manufacturers of brassieres have been making seamless cups formed by molding a fabric between a male mold and a female mold and then heating the molds to a temperature needed for molding. The molding procedure generally requires relatively long dwell times which results in inefficient production rates.

The temperature and dwell times during molding vary according to fabric characteristics. The fabric most commonly employed for making molded seamless cups is a heat settable knitted polyester. A typical molding process is carried out at an average temperature of about 400° F. This provides a fabric with setting characteristics above normally encountered laundering and drying temperates so the brassiere cup will be less likely to lose its set. It is not unusual for there to be some sticking of the fabric to the molds during this process.

Once molded, the perimeter of the brassiere cup components are cut to size to remove excess material. This is usually accomplished when the components are still within the molds. One procedure is to use die cutters with sharp edges to sever the excess fabric. Another procedure is to use a hot air knife, which uses extreme heat to sever the fabric. When a hot air knife is used, the flash resulting from the hot air knife melting the fabric adds to the problems of the cup sticking to the female mold.

Dwell time can be shortened if both the male and female elements of the mold are maintained at elevated temperatures at all times. For example, in one instance it was noted that there was a fifteen (15) second dwell time where a cold female mold was used and only a six (6) second dwell time with a hot female mold member, a difference of nine (9) seconds. This is a significant time difference since brassieres are manufactured in mass production quantities and must be manufactured as inexpensively and as quickly as possible. However, the use of constantly elevated temperates results in an even greater tendency for the molded cup to stick to the mold members particularly the female mold.

Various means have been employed to aid in removal of the molded articles from the molds. These include an inverted female which relies upon gravity with or without the use of vacuum suction or a blast of air to assist removal. However, gravity is often insufficient and the assist methods are not particularly desirable with constant heated molds. The use of suction as a removal means can cause marks to be formed on the fabric. Since the fabric is still heated the suction may reshape it and it will set with this reshaped contour. Hand removal is difficult due to the elevated temperatures and also has a tendency to leave a permanent impression on the article.

Accordingly, especially where constant heat mold members are used, there is a need for removal means which permit ready removal without distortion of the molded articles.

BRIEF DESCRIPTION OF THE INVENTION

In the invention as described, a material is placed between a male mold member and a female mold member. When the molds are brought together, the material is shaped. The molds are then separated. In the illustrated embodiment, the male mold member is movable and the female mold member remains stationary. However, it is contemplated that the male mold member would be stationary and the female mold member movable. In addition, the invention as has been described with reference to embodiments where the molded article is seated within the female mold member after molding. It is contemplated that in some molding operations a male mold and ring arrangement (as is known in the art) may be employed or the molded article may remain with the male member rather than the female member after molding. In such instances the extraction means hereinafter described will be located in a body member adaptable to be emplaced over the male mold member rather than within the female mold member.

The present invention provides a new and improved means for removing a molded article from the mold member with which the molded article remains after the molding operation. The invention provides a positive extraction mechanism which will engage a molded article after the molding operation and separate it from the mold over or in which it is seated. The extraction means has an extractor body having pin elements adapted to positively engage the molded article so it will be separated from the mold when the extractor body is moved away from such mold.

The invention is described with particular reference to the formation of cups for brassieres but is not necessarily so limited and can be used in connection with other molded items.

The invention comprises a body member having an outer surface adapted to be positioned into mated relationship with the mold member onto or into which the fabric has been molded. There is means within the body member to positively engage the molded article so as to grip it so it can be removed from such mold member. The positive engagements means include a plurality of pin-like members positioned within the body member. At the appropriate time, the pin-like members are urged outwardly through apertures in the body member to engagement with the molded article. Upon movement of the body member away from the mold, the molded article is also carried away from the mold.

In the preferred embodiment, the pin-like members are positioned within a cup-like extractor having the same general contour as the male mold member and the molded article remains with the female mold after molding. The pin members are in operative relationship with air cylinders which drive the pin members into engagement with the molded fabric article pneumatically. The pins are spring biased so they will be retracted from their position of engagement with the molded article upon removal of the pneumatic force.

In another embodiment, the pin-like members are mounted on leaf springs. Upon actuation of a drive member located between the leaf springs, a force is applied to the springs which is resolved by the springs in a manner which drives the pins in a generally horizontal direction. Upon release of the force, the pins are retracted by the recovery force of the leaf springs.

Preferably, although not necessarily, the pin-like members move in a generally-horizontal direction relative to the vertical axis of the mold carrying the molded article. Preferably the pin-like members engage but do not pass through the molded article. However, in some instances, two or more cup-like articles are formed simultaneously in a single mold. In such instances, the pin-like members will pass through one or more layers of the molded fabric article, but preferably, not through the outermost one.

Additional advantages of the invention will be set forth in the description which follows and, in part, will be obvious from the description.

DRAWINGS

The accompanying drawings illustrate various embodiments of the invention and, together with the description, serve to explain the principles of the invention.

Of the drawings:

FIG. 1 is a view partially in section of a male into female molding machine at the beginning of the operation.

FIG. 2 is a view similar to FIG. 1 showing the male and female mold members in engagement.

FIG. 3 is an embodiment of the invention shown partially in section with the extraction mechanism in position within the female mold.

FIG. 4 is a view similar to FIG. 3 with the extraction mechanism shown in retracted position.

FIG. 7 is an enlarged fragmentary detail view of the embodiment of FIGS. 5 and 6 of the invention.

FIG. 8 is an enlarged fragmentary detail view showing an air release for the molded fabric.

FIG. 9 is an enlarged fragmentary detail view showing another feature of the invention.

DETAILED DESCRIPTION OF THE INVENTION

Figure 5:
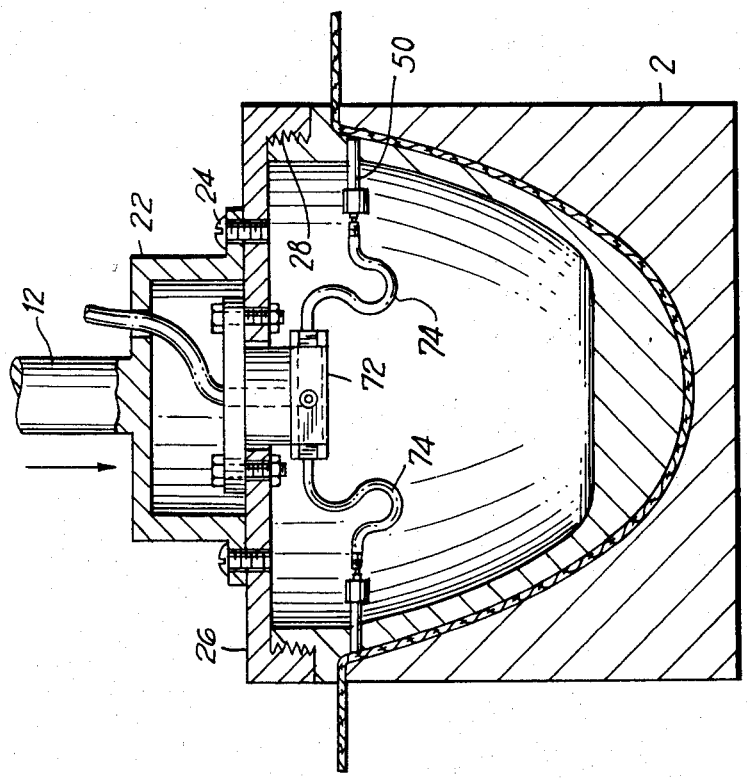
FIG. 5 is a view similar to FIG. 3 of another embodiment of the present invention.

FIGS. 1 and 2 illustrate a conventional male into female molding operation. In FIG. 1 there is shown a female mold member 2 and a male mold member 3. The male mold member 3 is urging the fabric F into the female mold member from a supply source (not shown). FIG. 2 shows the mold members in engagement. Conventional means to trim the fabric have been shown as an air jet 8, the air of which is heated by an electrical heating means 10 forming an air knife which severs excess fabric. Of course, the more commonly used cutting dies can also be employed.

Since the operation of FIGS. 1 and 2 are of the type where the molded portion of fabric F remains with the female mold member 2 after molding, the extractor mechanism which is provided is one which enters the female mold after the male mold has been retracted. As embodied the extractor includes a cup-like member 4 whose outer perimeter is shaped generally as is the male mold member. The cup-like member may be made of any suitable material. An aluminum filled epoxy commercially available from Devcon Corporation under the name DEVCON has been found suitable. It is light, durable, and once the molded article is carried with it it has excellent surface characteristic so that the molded article is not distored and can be easily released therefrom.

After the male member has been retracted, the extractor mechanism is advanced into the female mold member so that the cup-like body is in nested engagement with the molded fabric article.

Referring to FIG. 3, there is shown a female die member 2 and a cup-like extractor body 4 in mating relationship with the molded fabric F therebetween. The cup-like extractor body 4 is connected to a piston shaft 12 which is reciprocated by any convenient means, such as pneumatic means, cam shaft, etc. The means for connecting the shaft 12 to the extractor body 4 includes a supporting bridge 22. The supporting bridge is connected in any convenient manner such as screws 24 to a supporting member 26 which in turn is connected by screw threads 28 or the like to the cup-like body 4. A positive gripping means is provided for engaging the molded fabric. As embodied, the gripping means are pin-like members which are movable into and out of engagement with the molded article.

In one embodiment, (FIGS. 3-4), leaf springs 34 are embedded in the bottom surface 36 of the inverted cup-like body 4. The free ends of the leaf springs 34 have pin supports 38 attached to them in any convenient manner. The pin supports 38 have openings 38a for receiving the pins 40. In order to replace or adjust the position of the springs 40 there are set screw means 42.

In FIGS. 3 and 4 the means for causing outward movement of the pin gripping means includes a plunger 44 which has a coating which provides its smooth riding along the surface of the leaf spring 34.

The plunger 44 reciprocates up and down and can be actuated by any well-known conventional means such as a solenoid. As illustrated, an air hose 46 feeds air to the cylinder 48 to cause downward movement of the plunger 44, the plunger being returned upon the removal of the air supply in any convenient manner. The plunger 44 extends through an opening in the support 26 and is maintained in position by the bolts 43 and plate 45.

The number of pins can vary. Preferably there are three (3) pins positioned generally horizontally to the vertical axis of the female mold member 2. While brassiere cup molds are of a generally rounded contour, the molds have what is generally referred to as corners. These (as known in the art) are the major reference points and the interfaces between the compound curvatures of the mold. These corners are not necessarily equally spaced apart. The pins 40 pass through openings 41 in the cup-like body, preferably at locations adjacent these corners.

FIG. 3 shows the plunger 44 and the pins 40 in the retracted position. This is the position of the pins 40 when the cup-like body 4 is positioned into mated relationship with the female mold 2. When it is desired to remove the molded fabric from the female mold, the plunger 44 is actuated so as to move downwardly. This motion moves the leaf springs 34 apart. The pins 40 in response, move outwardly into engagement with the surface of the molded article. The cup-like body 4 is then moved upwardly away from the female mold 2 carrying with it the molded fabric F, removing it from the female mold member. The cup-like member 4 is then moved to a position away from the female mold 2, preferably over a storage bin (not shown). The plunger 44 is then retracted. The pins 40 disengage as the springs 34 retract them. The molded fabric will be sufficiently cool so that gravity will permit the fabric to fall in the bin.

Figure 6:
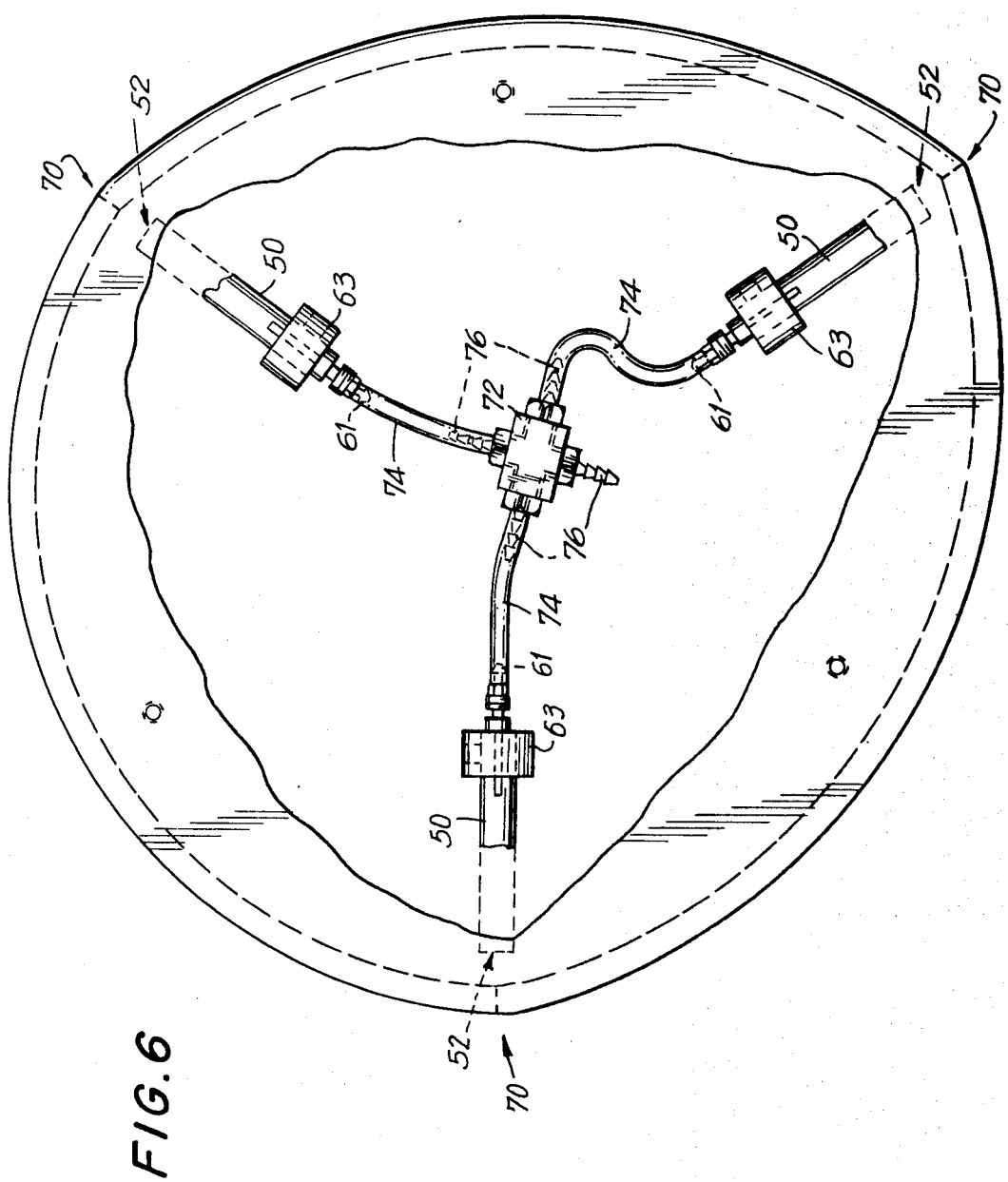
FIG. 6 is a top view of the embodiment of FIG. 5.

FIGS. 5-7 illustrate another embodiment of the extractor mechanism. In this embodiment the cup-like extractor body 4 is connected to the shaft 12 as in the other embodiment and there is a supporting bridge 22 connected by screws 24 to the supporting member 26. The screw threads 28 removably attach the body 4 to the support 26.

In this embodiment of the invention tubular members 50 connect to openings 51 in the cup-like extractor body and extend inwardly therefrom as shown in FIG. 6 and FIG. 7. The positive gripping extraction means includes gripping pins 52 having driving heads 54 positioned within the tubular members 50. As herein before described, preferably there are three (3) such pins located at the corners 70 of the inverted cup-like member. The gripping pins 52 are maintained in their normal retracted position by the helical springs 56 which are positioned between the ends of the tubular member 50 and the inner surface of the driving head 54.

The means for driving the gripping pins outwardly towards the outer surface of the male mold members includes driving pistons 58 within air cylinders 60 which may, as illustrated have pointed driving ends 62. The cylinders have nipples 61 adapted to receive pressurized air to drive the pistons 58 and the gripping pins 52 outwardly. The air cylinders 60 are maintained in position by the collars 63 and the screw means 65. Each tubular member includes a slot 51 which more easily permits adjustment of the circumference of each tubular member so as to assist in the relative positioning of the tubular member 50 and the collars 63 and screws 65 in maintaining the air cylinder 60 in the desired position. With this arrangement the positioning of the pins 52 can be more accurately controlled.

Referring to FIG. 6, the three gripping pin assemblies are joined by coupling 72 adapted to direct pressurized air to the air cylinders 60 through tubes 74 which may be made of urethane or the like and attached to the fittings or nipples 61 on the air cylinders and the nipples 76 on the coupling. The fitting 76 is adapted to be connected to a hose 80 (FIG. 5) leading to a suitable source of pressurized air.

As in the case of the previous embodiment after the molding operation, the extractor mechanism is positioned within the female mold member by a piston shaft 12 as shown in FIG. 5. Pressurized air through hose 80 then drives the pins 51 into engagement with the molded fabric article. The extractor mechanism is then removed from the female mold, thus removing the molded article. After removal of the molded article from the female mold and the cup-like body 4 is positioned away from the female mold, the air pressure is reduced causing retraction of the gripping pins 52 by the helical springs 56. The molded article will fall by gravity from the cup-like body.

If desired, in order to assist removal from the cup-like body 4, as shown in FIG. 8, a passageway 45 can be provided in the bottom of the cup-like body through which air under pressure can be passed. Upon application of the air blast, the molded article will be blown out of contact with the cup-like body. Since the article is now out of contact with heated mold members and has cooled somewhat, no discernable distortion occurs.

It is preferred that the pin gripping members not pass entirely through the molded fabric article and thus will not scratch the surface of the female mold. It has been found that sufficient engagement for carrying the molded article away from the mold is accomplished by pins which do not pass through the entire thickness of the fabric.

In some instances the gripping pins will pass entirely through one of the molded fabric articles and partially through the second (or third as the case may be). In such multiple layper molding operations it appears desirable that the mold member can be modified so that a portion of the pins can extend through even the outermost fabric. FIG. 9 illustrates such a construction. A slot 82 is formed in the top portion of the mold member so that the gripping pins do not scratch or mar the inner surface of the mold member.

The embodiment illustrated contemplates the removal of the molded article from the female mold. Other molding techniques mold articles in a manner which results in the molded article being retained on a male mold member. It should be obvious to one skilled in the art that the positive extraction mechanism can include a body portion in the shape of a female mold member with the pin-like members mounted therein.

It should be understood that many variations and modifications will now be obvious to those skilled in the art, and that the scope of the invention is not limited to the specific disclosure herein, but rather by the appended claims.

What is claimed is:

1. An extractor mechanism for disengaging a molded fabric article from a mold member comprising:
   (a) an extractor body member adapted to be moved into mating relationship with a mold member after a fabric molding operation;
   (b) pin means positioned in said extractor body member to move through openings extending through the outer perimeter of the extractor body member.
   (c) means for causing said pin means to move through said openings into engagement with the molded article;
   (d) means to move said body extractor member away from said mold member with molded article engaged by said pin means; and
   (e) means for retracting said pin means from engagement with the molded article after the extractor mechanism has been moved out of mating relationship with said mold.

2. An extractor mechanism as defined in claim 1 where the mold is a cup-like female mold and said extractor body has a complementary male, cup-like shape.

3. An extractor mechanism as defined in claim 2 wherein said pins are positioned inside of said extractor body.

4. An extractor mechanism as defined in claim 3 wherein said retracting means are springs.

5. An extractor mechanism as defined in claim 4 wherein springs are leaf springs which urge said pins away from engagement with the molded article.

6. An extractor mechanism as defined in claim 4 wherein said springs are helical springs which urge said pins away from engagement with the molded article.

7. An extractor mechanism as defined in claim 5 wherein plunger means are positioned within the cup-like extractor body which force said pins outwardly into engagement with the molded article.

8. An extractor mechanism as defined in claim 6 wherein piston means are positioned within said cup-like body to overcome the force of said helical springs and move said pins outwardly into engagement with the molded article.

9. An extractor mechanism as defined in claim 7 wherein one end of said leaf springs is attached internal of and the bottom of said cup-like member and said plunger moves downwardly to engage said leaf spring to force said pins outwardly of said cup-like member.

10. An extractor mechanism as defined in claim 8 having a coupling which directs pressurized air to said piston means to force said pins outwardly into engagement with the molded article.

11. An extractor mechanism as defined in claim 10 further including adjustment means to limit the amount of movement of said pins so that the pins do not extend through the molded fabric.

12. A positive extraction mechanism for disengaging molded articles from a mold in a fabric molding apparatus wherein cup-like articles are molded between a female mold member and a male mold member, comprising:
 (a) an extractor body adapted to move into and out of mating relationship with the molded article on one of the molded members;
 (b) a plurality of pins operatively associated with said extractor body to move through openings extending through the outer perimeter of said extractor body;
 (c) said pins having aligned so as to lie substantially at a right angle to the vertical axis of said mold members;
 (d) means operatively associated with said pins to move said pins through said openings into engagement with the molded article so that the molded article is removed from the mold member when said extractor body is moved to a non-mating relationship with the molded member; and
 (e) spring means operatively associated with said pins means to urge said pin means out of engagement with the molded article so that the molded article can be disengaged from said extractor body.

13. A positive extraction mechanism as defined in claim 12 wherein:
 (a) said extractor body has a cup-like shape adapted to be moved into and out of mating relationship with a cup-like molded member within a female mold;
 (b) a plurality of hollow cylindrical members are connected to the interior of said inverted cup-like body and said pin means are positioned within said hollow cylindrical member;
 (c) each pin has an enlarged piston head formed at one end of said pins; and
 (d) helical springs surround said pins engaging the enlarged piston head and one end of said hollow cylinder to urge said pins inwardly of said cup-like member.

14. A positive extraction mechanism as defined in claim 13 having a plurality of air cylinders which pneumatically actuate said pistons within said cylinders for moving said gripping pins into engagement with the molded article.

15. A positive extraction mechanism as defined in claim 14 wherein there are three gripping pins and wherein there is a slot about the upper edge of the female mold adapted to receive the ends of said gripping pins.

16. A positive extractor mechanism as defined in claim 15 having a coupling adapted to direct pressurized air to each of said cylinders.

* * * * *